United States Patent Office 3,005,683
Patented Oct. 24, 1961

3,005,683
SEPARATION OF TECHNETIUM FROM AQUEOUS SOLUTIONS BY COPRECIPITATION WITH MAGNETITE
Stanley J. Rimshaw, Loudon, Tenn., assignor to the United States of America as represented by the United States Atomic Energy Commission
No Drawing. Filed Dec. 11, 1959, Ser. No. 859,081
8 Claims. (Cl. 23—24)

My invention relates to a process for the recovery of technetium from aqueous media and more particularly to a process for precipitating technetium values from aqueous solution containing the same together with nuclear fission products.

Technetium, the artificial element of atomic number 43, has been found useful as a corrosion inhibitor. Extremely small quantities of technetium in the form of pertechnetate ion result in greatly decreased corrosion of ferrous metals by ordinarily corrosive aqueous solutions. For further details as to the use of pertechnetate ion to inhibit corrosion, reference may be made to U.S. Patent 2,837,474 by Groves H. Cartledge, issued June 3, 1958.

Technetium is a product of nuclear fission, and the usual source material for the recovery of technetium is an aqueous radioactive solution obtained in the processing of spent, irradiated uranium reactor fuel by solvent extraction with an organic extractant. Such processes generally comprise contacting and acidic aqueous solution of irradiated uranium with an organic extractant, by means of which the uranium is selectively extracted into the organic phase, with the fission products remaining in aqueous solution. For further details concerning solvent extraction processes for the decontamination of uranium from fission products, reference is made to a report and to the references therein, entitled "Symposium on the Reprocessing of Irradiated Fuels, Held at Brussels, Belgium, May 20–25, 1957," TID–7534, available from the Office of Technical Services. In addition to technetium and other fission products, the aqueous solutions obtained in these processes may contain substantial amounts of acid, and in particular nitric acid, aluminum, corrosion products such as iron and extraneous impurities. For example, a typical aqueous fission product solution obtained in the "Purex" process described in the above-mentioned reference contains 2.0 N nitric acid, 0.2 gram aluminum per liter and 0.05 gram iron per liter, together with extraneous impurities.

Technetium has been recovered from aqueous fission product solution by means of precipitation on various carriers such as tetraphenylarsonium perchlorate or perrhenate and by precipitation as technetium sulfide in hydrochloric acid or sulfuric acid solution. The tetraphenylarsonium method, however, presents disadvantages in the requirement of expensive reagents and in the difficulty of separating the technetium from the carrier. Sulfide precipitation is ineffective in solutions containing substantial amounts of nitrates, which solutions provide the primary source of technetium. Hydrous precipitates such as aluminum, lanthanum, and ferric hydroxides have also been employed, but only a small percentage, e.g., 10 percent, of the technetium is carried on these precipitates.

It is, therefore, an object of my invention to provide a method for the recovery of technetium from an aqueous solution containing the same together with extraneous impurities.

Another object is to provide a method of precipitating technetium from an aqueous fission-product solution.

Another object is to provide a carrier precipitation method for the recovery of technetium in which relatively inexpensive reagents are employed.

Another object is to provide a method of recovering technetium from an aqueous nitric acid solution.

Another object is to provide a method of recovering technetium in carrier-free form.

Other objects and advantages of my invention will be apparent from the following detailed description and claims appended hereto.

In accordance with the broadest aspects of my invention, technetium values can be recovered from an aqueous medium containing a mixture of metals including technetium dissolved and/or dispersed therein by a process which comprises converting said technetium to and/or maintaining said technetium in the +4 oxidation state, contacting the resultant medium with finely divided magnetite and thereafter separating a technetium-bearing magnetite product.

I have found that magnetite is a particularly sensitive and selective sorbent for technetium values in the +4 oxidation state.

Technetium exists in solution in two principal oxidation states, as a relatively stable +7 species and a relatively unstable +4 species. In practicing my invention to recover technetium values from an aqueous medium, for example, a solution consisting of a mixture of metal fission products containing technetium in the +7 and +4 oxidation states, I add thereto an appropriate reducing agent to convert said technetium to and/or maintain said technetium in the +4 oxidation state. In order to concentrate and recover the technetium, this aqueous mixture is then contacted with a finely divided magnetite to form a technetium-bearing magnetite precipitate. Upon digestion of the magnetite precipitate, substantially all of the technetium is sorbed or otherwise carried by the magnetite and by a subsequent relatively simple operation, to be described more fully hereinafter, a carrier-free technetium product is obtained. This method is applicable to nitric acid-bearing fission-product solutions obtained in the uranium separation processes referred to above and may be utilized in conjunction with other fission product recovery processes.

Although my invention is not to be understood as limited to a particular theory, it is postulated that technetium, as $TcO_2$, is incorporated isomorphously in the magnetite crystal lattice. In order to be carried by magnetite, technetium in its +7 valence state is reduced to $Tc(+5)$ and $Tc(+4)$, with the reaction being represented as follows:

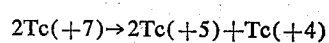

The $Tc(+4)$ is precipitated as $TcO_2$ and the $Tc(+5)$ disproportionates in the following reaction:

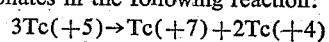

The $Tc(+7)$ thus produced is reduced as described above, and the $Tc(+4)$ precipitates. This type mechanism is indicated by the relative amounts of technetium carried by the magnetite precipitate with increasing digestion times.

Technetium is reduced to the +4 valence state by providing a reducing agent in the aqueous solution. Any reducing agent strong enough to provide a reducing potential of at least 0.738 volt versus a standard calomel electrode may be employed, this being the potential required to reduce $Tc(+7)$ to $Tc(+4)$. Hydrazine is preferred as the reducing agent because it is less corrosive than other common reducing agents such as sulfur dioxide. Any hydrazine concentration of at least approximately 0.05 molar in the aqueous solution may be employed, and a concentration within the range of 0.05 to 0.1 molar is preferred.

While the method of my invention may be carried out by the introduction of magnetite from an external source into a technetium-containing aqueous medium it has been found preferable, as a matter of practical convenience, to form the magnetite directly in the technetium-containing medium.

Magnetite is a readily identified, dense, black precipitate with the approximate formula $Fe_3O_4$. The method of forming magnetite in aqueous solution may be carried out by any of several known methods. For example, a magnetite precipitate is formed in aqueous basic solution having a pH of at least 7 by the reaction of both ferrous and ferric ions. This magnetite precipitate is distinct from ferrous hydroxide, a flocculent white precipitate formed by the reaction of ferrous ions and an alkaline reagent in the absence of oxygen, and ferric hydroxide formed by the reaction of ferric ions with an alkaline reagent. Ferric hydroxide is a gelatinous reddish precipitate which carries only a small percentage of technetium from solution.

Another and preferred method of forming magnetite in the aqueous solution is to provide ferrous ions and an excess of an alkaline reagent in the technetium-bearing solution. It is preferred that the magnetite precipitate be formed at a temperature of about 50° C. and maintained at temperature until the formation of the precipitate is completed. Even in the presence of the reducing agent added to maintain technetium in the +4 valence state, the ferrous ions are partially converted to the ferric state, thus providing iron in both the +2 ferrous and +3 ferric oxidation states and favoring the formation of magnetite. Although the temperature is not critical, the reaction proceeds more rapidly at temperatures over 50° C., and a temperature within the range 60° C. to 70° C. is especially preferred. Lower temperatures should be avoided as it may also result in the formation of substantial amounts of difficultly separable ferric hydroxide in the magnetite precipitate.

Ferrous ions may be supplied in the form of any ferrous salt such as ferrous sulfate or ferrous sulfamate. If ferric ions are already in solution, as is frequently the case as a result of corrosion of ferrous metals by process solutions, ferrous ions may be obtained as a result of reduction to the ferrous state by the reducing agent added to reduce technetium. The amount of ferrous ions employed to carry technetium from solution is not critical. It is preferred, however, to employ from 50 to 100 milligrams per liter of solution in order to obtain a precipitate sufficiently large to separate from the solution. This amount of ferrous ion is sufficient to carry substantially all of the technetium from solution.

Any alkaline reagent such as an alkali metal hydroxide or ammonium hydroxide may be employed, and sodium hydroxide is preferred because of its low cost and availability. In the case of an acidic starting solution a sufficient amount of alkaline reagent to neutralize the solution is required, and a slight excess is preferred. For alkaline starting solutions no further alkaline reagent is required, the magnetite being precipitated directly upon addition of ferrous ions.

The amount of technetium in the starting solution is not critical to my invention, since magnetite selectively sorbs technetium in the +4 oxidation state even when the concentration of technetium present of solution is in the order of microgram amounts. As a practical matter, however, the recovery of amounts of technetium below approximately 0.1 to 0.5 milligram per liter is not economical. In fission-product solutions resulting from the large-scale uranium separation processes referred to above, the concentration of technetium is generally above 3 milligrams per liter.

Maximum recovery of technetium may be obtained by digesting the solution after addition to, or formation of the magnetite therein. The magnetite precipitate, which forms initially in the first few minutes, carries 40 to 50 percent of the technetium. Increasing amounts of technetium are carried with increasing digestion time up to a recovery of 95 to 98 percent after one hour.

The digestion temperature is not critical, and any temperature from room temperature up to about 80° C. may be conveniently employed. Higher temperatures tend to destroy the preferred reducing agent, hydrazine.

Although the composition of the starting solution is not critical, in the processing of solutions containing amounts of aluminum in excess of approximately 5 grams per liter, it is preferred to remove the aluminum prior to technetium precipitation because of the excessive amount of caustic required to maintain the aluminum in solution. Aluminum precipitates at a pH of about 7, forming a voluminous aluminum hydroxide precipitate which dissolves upon addition of excess caustic. Aluminum may be removed from solution by means of precipitation as aluminum alum, as disclosed in my copending application S.N. 551,186, filed December 5, 1955, for "Separation of Cesium–137," now U.S. Patent 2,925,323. The aluminum-depleted filtrate from this process is particularly suitable for magnetite precipitation. For solutions containing smaller amounts of aluminum, it is preferred to use a slight excess of alkaline reagent, e.g., 0.5 N excess sodium hydroxide, to avoid the precipitation of aluminum along with magnetite.

The technetium-bearing magnetite precipitate formed as described above may be readily separated from solution by any conventional means such as centrifuging or filtering. In order to obtain technetium in carrier-free form, the precipitate is dissolved in nitric acid or hydrochloric acid to dissolve the iron. The iron is then separated from solution by precipitation as ferric hydroxide upon addition of an alkaline reagent such as ammonium hydroxide. At this stage, it is preferred to add a small amount of oxidizing agent such as hydrogen peroxide to the solution to insure complete conversion of the iron to the ferric state and thereby prevent the reformation of magnetite.

In processing starting solutions containing rare-earth fission products and strontium, appreciable amounts of these radioactive impurities may be coprecipitated along with the magnetite precipitate containing the technetium. However, the ferric hydroxide has been found to act as an excellent sorption medium for these impurities, so that the step of forming ferric hydroxide actually serves as an additional purification step. Surprising enough, the technetium concentration in solution is virtually unaffected by the formation and subsequent precipitation of the gel-like ferric hydroxide.

The separated technetium, in the form of an aqueous nitrate solution, may be readily converted to pertechnetate ions by reprecipitating the technetium from solution with magnetite and contacting the precipitate with an aqueous ammonium hydroxide-hydrogen peroxide solution, e.g., 1.0 M $MH_4OH$, 0.5 M $H_2O_2$. The technetium is extracted into solution as ammonium pertechnetate by this means, with the magnetite remaining undissolved.

My invention is further illustrated by the following specific examples.

EXAMPLE I

Four acidic technetium-bearing solutions were subjected to the following procedure: To each solution ferric iron was added to produce a concentration of 0.1 gram per liter. Hydrazine was then added to the acid solution to reduce at least a portion of the ferric ions to the ferrous state; a hydrazine concentration of 0.1 M was used in the solution in each case. A magnetite precipitate was formed by adding sufficient sodium hydroxide to neutralize the solution and produce an excess of 0.5 N at a temperature of about 70° C. The magnetite-bearing solution was then digested for one hour at 70° C., and the precipitate was separated from solution by centrifuging. In each case the amount of technetium in the starting solution and in the centrifugate was determined by measuring the technetium radioactivity with conventional radiometric methods. The results obtained are summarized in the following Table I.

TABLE I
Recovery of technetium by magnetite precipitation

| Run Number | | Volume of Solution, Liter | Technetium Content, Milligrams Per Liter | Total Technetium, Grams | Yield, Percent |
|---|---|---|---|---|---|
| 1 | Initial Solution | 795 | 15.8 | 12.6 | 98.4 |
|   | Final Solution | [1] 814 | 0.23 | 0.2 | |
| 2 | Initial Solution | 727 | 23.2 | 16.9 | 95.9 |
|   | Final Solution | [1] 980 | 0.68 | 0.7 | |
| 3 | Initial Solution | 704 | 15.8 | 11.1 | 97.3 |
|   | Final Solution | [1] 965 | 0.35 | 0.3 | |
| 4 | Initial Solution | 746 | 22.9 | 17.1 | 94.1 |
|   | Final Solution | [1] 780 | 1.19 | 1.0 | |

[1] In each case the volume of solution was increased by the addition of reagents to precipitate magnetite.

It may be readily seen that technetium is effectively carried from solution by the magnetite precipitate, recoveries of 94.1 to 98.4 percent being obtained in large-scale processing.

EXAMPLE II

In order to determine the effect of digestion time on the amount of technetium carried by a magnetite precipitate, three parallel experiments were conducted with tracer amounts of technetium. In experiment 1 a solution containing 5.0 N sodium nitrate, 0.2 M sodium sulfate, 0.1 M sodium aluminate and a tracer amount, i.e., approximately $10^{-4}$ milligrams technetium per liter of solution was prepared. To this solution was added fifty milligrams of iron, as a concentrated solution of ferrous ammonium sulfate, and sufficient hydrazine to produce a solution .1 M in hydrazine. A magnetite precipitate formed rapidly without addition of caustic, since the solution was already alkaline. The precipitate was agitated in solution at about 80° C. for one hour and then left to stand overnight at room temperature. Ten milliliter aliquot samples of precipitate slurry were withdrawn at various time intervals and the precipitate in each sample was separated from the solution by centrifuging. The amount of technetium in the precipitate was then determined by measuring the technetium radioactivity with conventional radiometric instrumentation. The percentage of the total technetium which had been carried was then calculated from the sample amount.

In Experiments 2 and 3 the starting solution comprised 5.0 N sodium nitrate, 0.05 M ammonium alum

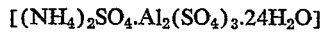

$[(NH_4)_2SO_4 \cdot Al_2(SO_4)_3 \cdot 24H_2O]$ 0.1 gram ferric iron per liter, 0.3 N $HNO_3$ and a tracer amount of technetium. Hydrazine was added to produce a 0.1 M concentration in the solution and magnetite was precipitated by the addition of sufficient excess sodium hydroxide to neutralize the solution and produce a 0.5 N excess in the final solution at a temperature of 80° C. The solution was then digested and sampled in the same manner as in Experiment 1. The results are summarized in Table II.

TABLE II

Carrying of technetium by magnetite as a function of digestion time

| Experiment 1 | | Experiment 2 | | Experiment 3 | |
|---|---|---|---|---|---|
| Time of Digestion, Minutes | Percent Technetium Carried | Time of Digestion, Minutes | Percent Technetium Carried | Time of Digestion, Minutes | Percent Technetium Carried |
| 5 | 20 | 0 | 55 | 0 | 63 |
| 30 | 55 | 15 | 85 | 10 | 77 |
| 45 | 55 | 30 | 89 | 20 | 84 |
| 60 | 90 | 45 | 91 | 60 | 93 |
| Sitting overnight at room temperature | 88 | 60 | 92 | | |
| | | 75 | 90 | | |

It may be seen that although a large amount of technetium is carried initially by the precipitate, increasing digestion times results in substantially higher recoveries.

It is to be understood that the above examples are merely illustrative and are not to be construed as limiting the scope of my invention, which is limited only as indicated by the appended claims. For example, my invention is applicable to the separation and concentration of technetium from a mixture containing any one or a combination of a number of elements, among which include ruthenium, rhenium, molybdenum, the lanthanide rare earths such as cerium, the actinide rare earths such as uranium or plutonium, aluminum, iron, barium and the alkali earths.

It is also to be understood that numerous variations in procedure may be employed within the scope of my invention, particularly with respect to the method of forming the magnetite precipitate and the use of other fission product recovery processes in conjunction with the process of my invention.

Having thus described my invention, I claim:

1. A method of selectively separating technetium in the +4 oxidation state from an aqueous basic solution containing products of uranium fission which comprises contacting said solution with finely divided magnetite and thereafter recovering a technetium-bearing precipitate therefrom.

2. A method of recovering technetium values from an aqueous basic solution wherein said technetium exists in the +7 oxidation state which comprises adding at least a stoichiometric amount of a reducing agent having a reducing potential of at least 0.738 volt versus a standard calomel electrode to said solution to convert and maintain the technetium in the +4 oxidation state, providing finely divided magnetite in and heating the said resultant solution to a temperature of at least about 50° C. to selectively carry substantially all of the technetium values, and thereafter separating the resultant technetium-bearing magnetite precipitate.

3. A method of recovering technetium values from an acidic aqueous solution wherein said technetium is in the +7 oxidation state which comprises adjusting the pH of said solution to a basic value providing finely divided magnetite in said solution and at least a stoichiometric amount of hydrazine to convert and maintain said technetium in the +4 oxidation state, heating the resulting mixture at a temperature of at least 50° C. to digest the resultant technetium-bearing precipitate and thereby promote the technetium carrying efficiency of said magnetite, and thereafter separating the resulting technetium-bearing precipitate from said solution.

4. The method of claim 3 in which the concentration of hydrazine in said solution is at least approximately 0.05 molar.

5. A method of recovering technetium values from an alkaline solution in which said technetium is in the +7 oxidation state which comprises providing finely divided magnetite in said solution and at least a stoichiometric amount of a reducing agent to convert and maintain said technetium in the +4 oxidation state, digesting the resulting mixture at a temperature of at least approximately 50° C. until the technetium carrying action of said magnetite has been substantially completed, and separating the resulting technetium-bearing precipitate from solution.

6. The method of claim 5 in which the reducing agent is hydrazine.

7. A method of recovering technetium values from an aqueous acidic solution in which said technetium is in the +7 oxidation state which comprises adjusting said solution to a basic pH, providing a source of finely divided magnetite in said solution and at least a stoichiometric amount of a reducing agent to reduce said technetium to and maintain said technetium in the +4 oxidation state, digesting the resulting magnetite-containing mixture at a temperature in the range 50–80° C., separating the resulting technetium-bearing precipitate from said solution, and thereafter extracting said technetium values, as a pertechnetate salt, from said precipitate.

8. A method of recovering technetium values from aqueous acidic solution wherein said technetium exists in the +7 oxidation state and wherein said solution contains fission products of uranium which comprises adjusting said solution to a basic pH, providing in said solution a source of finely divided magnetite, and at least a stoichiometric amount of hydrazine to reduce said technetium to and maintain said technetium in the +4 oxidation state, digesting the resulting technetium-bearing magnetite precipitate at a temperature in the range 50–80° C., and thereafter separating said precipitate from said solution.

References Cited in the file of this patent

UNITED STATES PATENTS 2,917,359     Davies  ---------------- Dec. 15, 1959

OTHER REFERENCES

Hackney, J. C.: "Journal of Chemical Education," vol. 28, April 1951, pages 186–190.

Segre, E., et al.: "Journal of Chemical Physics," vol. 7, March 1939, pages 155–156.